US008846232B2

(12) United States Patent
Tse

(10) Patent No.: US 8,846,232 B2
(45) Date of Patent: Sep. 30, 2014

(54) FLASH COOLING SYSTEM FOR INCREASED BATTERY SAFETY

(75) Inventor: David YuanJei Tse, Woodside, CA (US)

(73) Assignee: Atieva, Inc., Redwood City, CA (US)

(*) Notice: Subject to any disclaimer, the term of this patent is extended or adjusted under 35 U.S.C. 154(b) by 185 days.

(21) Appl. No.: 12/943,882

(22) Filed: Nov. 10, 2010

(65) Prior Publication Data

US 2011/0111269 A1 May 12, 2011

Related U.S. Application Data

(60) Provisional application No. 61/260,394, filed on Nov. 11, 2009.

(51) Int. Cl.
| | |
|---|---|
| H01M 10/50 | (2006.01) |
| H01M 10/48 | (2006.01) |
| B60K 11/00 | (2006.01) |
| H01M 10/42 | (2006.01) |
| B60L 1/00 | (2006.01) |
| B60L 11/18 | (2006.01) |
| H01M 10/613 | (2014.01) |
| B60L 3/00 | (2006.01) |
| B60K 28/14 | (2006.01) |
| B60L 3/04 | (2006.01) |
| H01M 10/6563 | (2014.01) |
| B60K 1/00 | (2006.01) |

(52) U.S. Cl.
CPC ........... *H01M 10/5004* (2013.01); *B60K 11/00* (2013.01); *Y02T 10/7044* (2013.01); *H01M 10/42* (2013.01); *B60L 1/003* (2013.01); *B60L 11/1861* (2013.01); *Y02T 10/7005* (2013.01); *B60L 3/0069* (2013.01); *H01M 10/5067* (2013.01); *B60L 2240/545* (2013.01); *B60K 2001/005* (2013.01); *Y02E 60/12* (2013.01); *B60L 11/1874* (2013.01); *B60K 28/14* (2013.01); *B60L 3/0007* (2013.01); *B60L 11/1875* (2013.01); *Y02T 10/7061* (2013.01); *B60L 3/04* (2013.01); *B60L 11/1866* (2013.01)
USPC ............................................ 429/120; 429/90

(58) Field of Classification Search
USPC .................. 429/50, 61–62, 90, 120
See application file for complete search history.

(56) References Cited

U.S. PATENT DOCUMENTS

| | | | |
|---|---|---|---|
| 4,633,418 | A | 12/1986 | Bishop |
| 5,214,370 | A | 5/1993 | Harm et al. |

(Continued)

FOREIGN PATENT DOCUMENTS

WO 9831059 A1 7/1998

*Primary Examiner* — Muhammad Siddiquee
(74) *Attorney, Agent, or Firm* — Womble Carlyle Sandridge & Rice LLP

(57) ABSTRACT

In a battery pack having multiple battery cells distributed, for example, between multiple interconnected battery modules, a run-time cooling system is provided to cool (and/or heat) the battery cells during routine charging and discharging of the cells (e.g., powering a load such as a motor within an electric or hybrid-electric vehicle), and an emergency cooling system to cool the battery cells in response to a signal indicating detection of one or more conditions indicating possible thermal runaway within the battery cells or battery modules. The run-time cooling system, which may include a fan, HVAC unit or other fluid pumping device, induces continuous coolant flow within the battery pack (e.g., flow of air or other gaseous or liquid coolant). The emergency cooling system, by contrast, includes a mechanical interface or is otherwise adapted to receive a receptacle containing pressurized coolant or other flash-cooling device.

10 Claims, 4 Drawing Sheets

Battery Module Side View Showing Coolant Flow

(56) References Cited

U.S. PATENT DOCUMENTS

| | | |
|---|---|---|
| 5,574,355 A | 11/1996 | McShane et al. |
| 6,504,342 B2 | 1/2003 | Inui et al. |
| 6,953,638 B2 | 10/2005 | Inui et al. |
| 7,128,999 B1 | 10/2006 | Martin et al. |
| 7,424,926 B2 | 9/2008 | Tsuchiya |
| 7,433,794 B1 | 10/2008 | Berdichevsky et al. |
| 2005/0064280 A1* | 3/2005 | Watanabe et al. ............ 429/120 |
| 2008/0280192 A1* | 11/2008 | Drozdz et al. ................. 429/62 |
| 2010/0136391 A1* | 6/2010 | Prilutsky et al. .............. 429/62 |

* cited by examiner

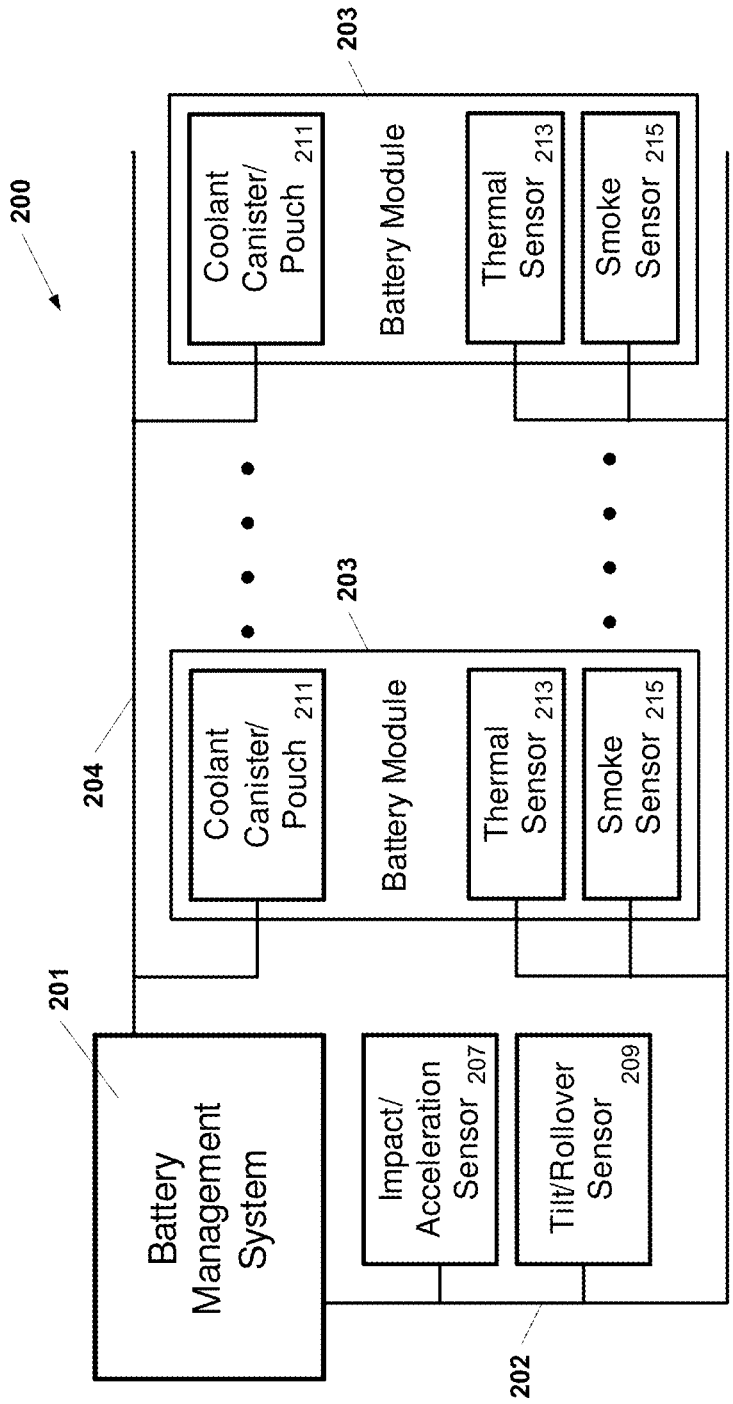
Figure 2. Flash Cooling System Block Diagram

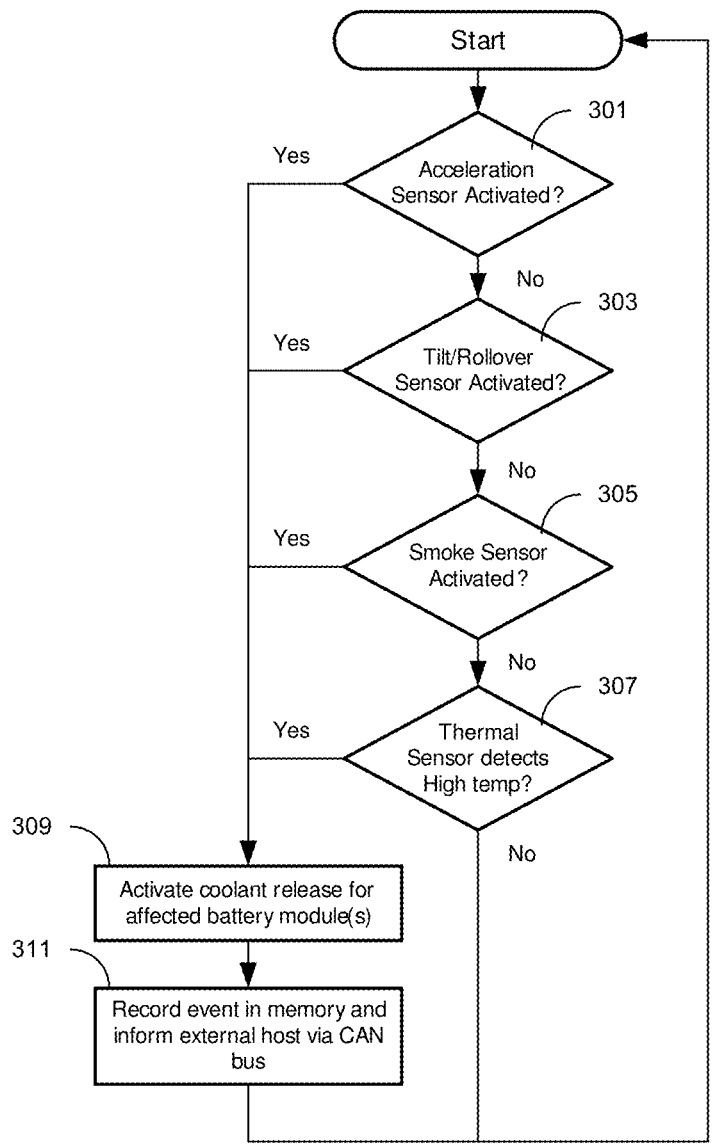
Figure 3. Control Flow Diagram for Activating Coolant

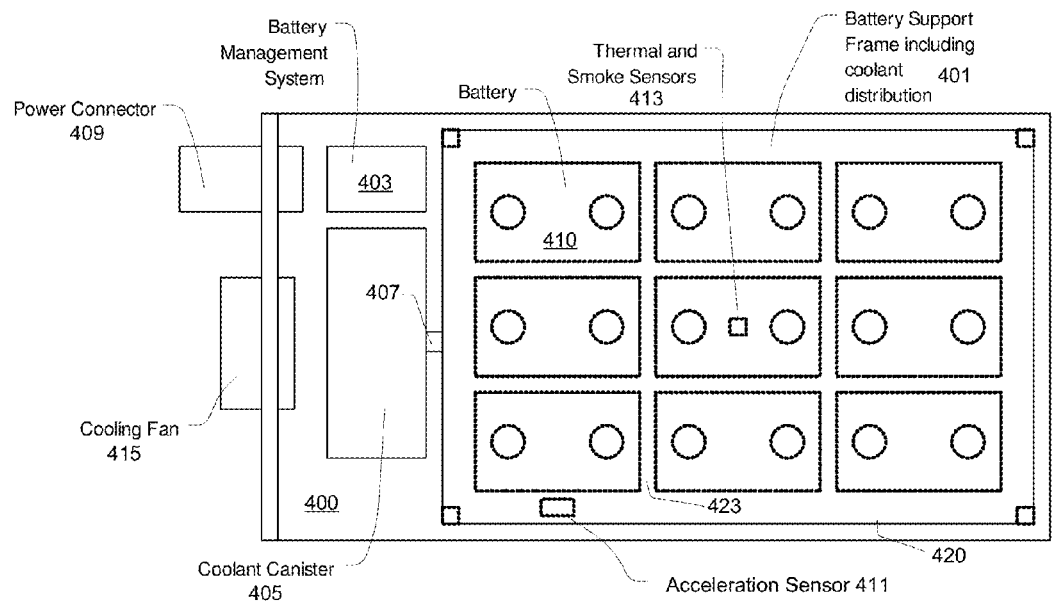
Figure 4. Battery Module Top View
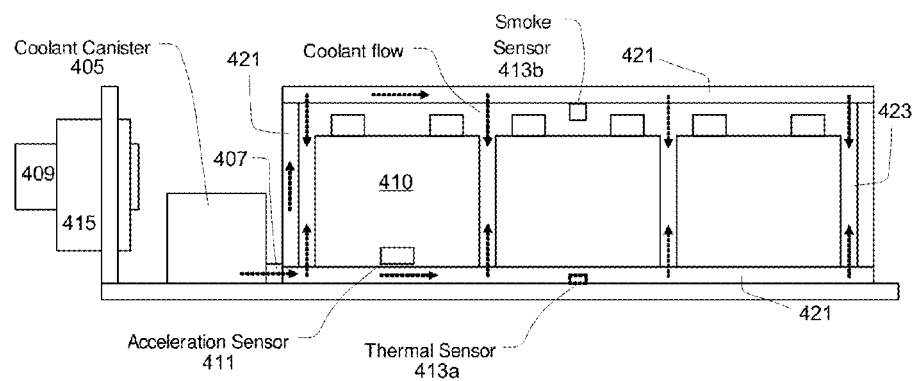
Figure 5. Battery Module Side View Showing Coolant Flow

FLASH COOLING SYSTEM FOR INCREASED BATTERY SAFETY

CROSS-REFERENCE TO RELATED APPLICATIONS

This application claims priority to, and hereby incorporates by reference, U.S. Provisional Application No. 61/260,394, filed Nov. 11, 2009 and entitled "Flash Cooling System for Increased Battery Safety."

TECHNICAL FIELD

The present invention relates generally to the field of energy storage systems and more particularly to multi-cell battery systems.

BACKGROUND

When subject to excessive thermal or mechanical stress, high energy density batteries (such as those in vehicular applications) can uncontrollably release their energy and explode or catch fire in a dangerous exothermic reaction called a thermal runaway. If several batteries are used in close proximity (which is normal for vehicles using battery power), the thermal energy generated by one damaged battery may transfer to others, causing those adjacent batteries to undergo the same exothermic reactions, thus propagating a chain of dangerous reactions.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an embodiment of a flash-cooling battery system;

FIG. 3 is an exemplary flow diagram illustrating determinations and operations that may be undertaken within the battery management system shown in FIG. 2 to effect a flash-cooling operation; and FIGS. 4 and 5 illustrate top and side views of an embodiment of a battery system and constituent battery module.

DETAILED DESCRIPTION

Figure 1:
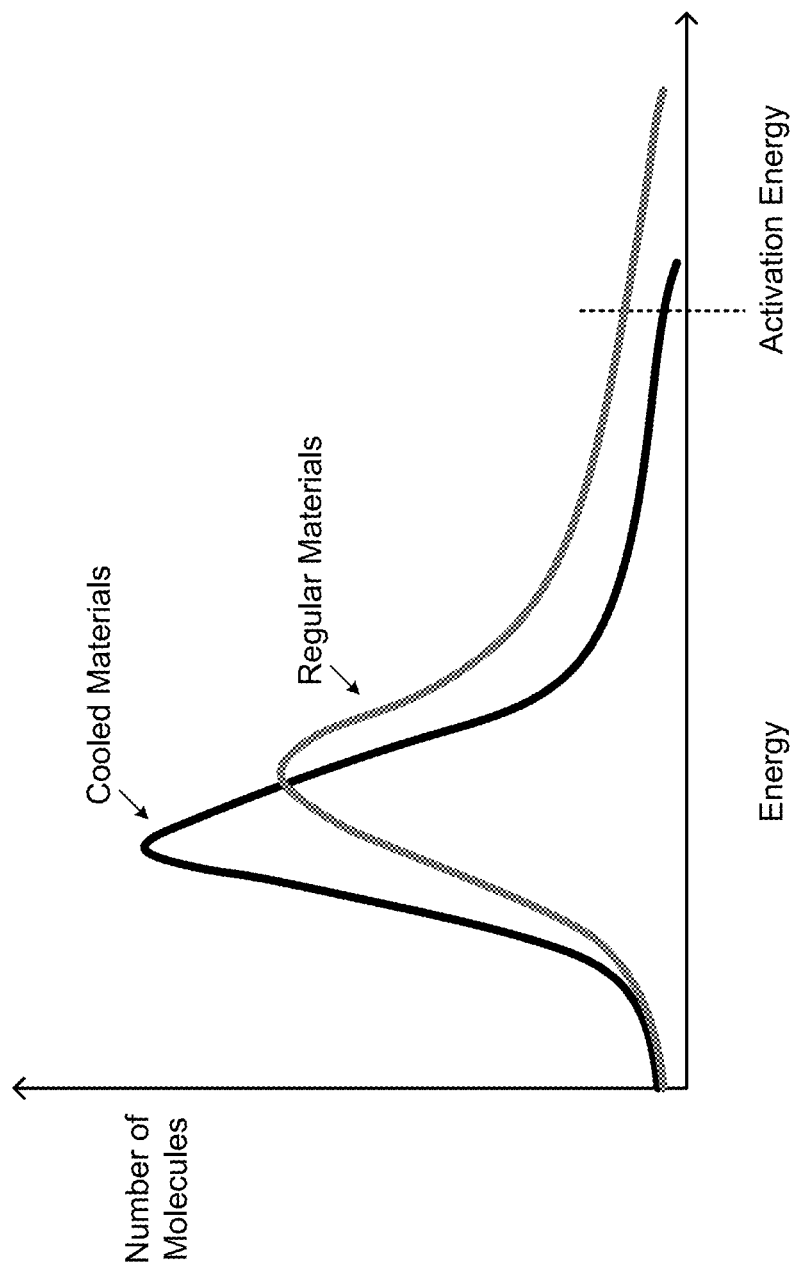
FIG. 1 illustrates an energy distribution profile within a battery, illustrating a difference between materials that have been cooled and like materials that have not been cooled.

Many technologies are used in gasoline vehicles to deploy safety measures preemptively in order to minimize casualties and damage. For example, in automobiles, accelerometers detect rapid decelerations prior to collisions and deploy airbags for increased passenger safety. However, for electric vehicles, few if any mechanisms exist to reduce the chance of a runaway exothermic reaction caused by mechanical damage to a battery after a collision.

The battery system proposed herein incorporates features to reduce the chance that a single battery will enter a thermal runaway state when damaged, as well as decrease the likelihood that the thermal runaway state will be propagated to nearby batteries in the pack. The thermal runaway reaction that occurs upon mechanical damage to a battery cell is a chemical reaction that converts the components in the cell into more stable products, releasing heat in the process.

The reacting molecules must reach a certain energy threshold, or activation energy, before the reaction can take place. Given a sample of molecules, the energy distribution across these molecules is non-uniform, as shown in FIG. 1. At any given temperature, there is a fraction of molecules in the sample that has energy at or above the activation energy. This fraction reflects the probability that the reaction will occur, and therefore the overall rate of the reaction. However, this energy distribution is affected by the temperature of the molecules. As shown, by the "cooled materials" and "regular materials" energy profiles in FIG. 1, by cooling the molecule sample, the fraction of the molecule sample at or above the activation energy is decreased, so the probability that the reaction will occur decreases as well, thereby decreasing the overall rate of the reaction.

Accordingly, in the context of a battery pack containing numerous cells, cooling will reduce the rate of any thermal runaway reaction such that it progresses more slowly and thus proceed in a much more controlled manner. The exothermic reaction would also be less likely to propagate to nearby cells, as emitted thermal energy from the damaged cell would first be absorbed to overcome the affects of the cooling. Only the energy remaining would then be available to contribute to raising the energy of the nearby cells to their thermal runaway activation energy. Thus, by cooling all individual cells prior to mechanical abuse, damaged cells take longer to undergo thermal runaway and are less likely to cause nearby cells to do so. This slowed reaction is demonstrated by the fact that cooled healthy batteries discharge current at a lowered rate as compared to warmer batteries due to slower reaction progress because of the lower temperature.

This battery system includes thermal and mechanical stress sensors that can activate a flash cooling system to rapidly cool affected batteries when abnormal situations are detected, thus providing an emergency supplement to any other cooling mechanism that be present, for example, to maintain the general operating temperature of the batteries, such as fans HVAC (heating, ventilation, air conditioning) pumps, etc. FIG. 2 shows a block diagram of an embodiment of such a flash-cooling battery system 200.

Referring to FIG. 2, each Battery Module 201 (which would contain several batteries) has one or more thermal and smoke sensors (213, 215) along with a coolant canister and delivery system 211. Though not required, it is desirable to have separate sensors and cooling systems in each battery module 203 to minimize damage when an event occurs as the coolant may then be delivered by a selected coolant canister/pouch 211 only to the affected Battery Modules. That is, the coolant release may be an emergency, one-time event, after which the affected Battery Module may require replacement or service before being re-applied for power-delivery purposes. The entire battery system has one or more Impact/Acceleration and Tile/Rollover sensors (207, 209) to determine if the vehicle has been impacted in such a way that could cause damage to the batteries. As shown, the flash-cooling battery system 200 includes a battery management system 201 (e.g., having a processor or other control unit that executes memory-stored program code) that receives input signals 202 from battery-pack status sensors 207, 209 and battery module sensors (e.g., thermal sensor 213, smoke sensor 215, etc.) and, based on the status of the battery-pack and battery modules, that outputs respective control signals 204 to the coolant canisters 211 to trigger coolant release according to the status or conditions detected. Although not specifically shown, battery management system 201 may perform numerous other functions in connection with the individual battery modules and the overall battery pack, including determining an ongoing state of charge (SOC), controlling one or more continuous-use cooling systems as necessary to maintain general battery module/pack temperature during normal run-time operation, and so forth.

In one embodiment, Battery Management System (BMS) 201 executes the flow diagram shown in FIG. 3 to determine when to activate the cooling system in a particular battery module. At decision blocks 301, 303, 305, 307, each of the sensors shown in FIG. 3 is checked to determine if an event has occurred. The order in which the BMS checks the sensors may be different for different embodiments of this invention. Also some sensors may be omitted and other different sensors added to improve the speed and/or accuracy of the prediction of a situation that could cause a thermal runaway condition. If an event is detected (i.e., affirmative determination in any of decision blocks 301, 303, 305, 307) then the coolant is released at 309 and the event recorded and communicated to the vehicle's host processor at 311.

There are numerous other types of coolant chemicals and distribution methods that could be used to cool the affected batteries. One embodiment, show in top and side views of a battery system 400, in FIGS. 4 and 5, respectively, uses ammonium nitrate and water that are mixed by opening a valve 407 in the Coolant Canister 405. Tubes 421 in the Battery Support Frame 401 allow the coolant to be pumped into the spaces 423 between the batteries 410 to allow rapid cooling to occur when sensors (i.e., acceleration/impact sensor 411, thermal and smoke sensors 413*a* and 413*b* (collectively 413), etc.) detect events indicating that standard operational cooling mechanisms such as fan 415, HVAC or the like may be insufficient to prevent thermal runaway or other dangerous thermal events. Power connector 409 may include one or more contactors (semiconductor devices, relays or other switching elements) that may be opened by the battery management system 403 to decouple the battery module 420 (or all such modules 420) from the load. Other embodiments of this invention could use other chemicals such as refrigeration coolant or inert gases in liquid form distributed in a different manner.

The battery pack system described herein uses multiple sensors within the pack to predict if one or more batteries are likely to enter a dangerous thermal runaway condition due to a physical event. If such an event is detected, a rapid cooling system is deployed to reduce the energy within the battery pack. When used in vehicular applications this will reduce the likelihood of an explosion and/or fire occurring after a collision.

Summarizing the foregoing, in a battery pack having multiple battery cells distributed, for example, between multiple interconnected battery modules, a run-time cooling system is provided to cool (and/or heat) the battery cells during routine charging and discharging of the cells (e.g., powering a load such as a motor within an electric or hybrid-electric vehicle), and an emergency cooling system to cool the battery cells in response to a signal indicating detection of one or more conditions indicating possible thermal runaway within the battery cells or battery modules. The run-time cooling system, which may include a fan, HVAC unit or other fluid pumping device, induces continuous coolant flow within the battery pack (e.g., flow of air or other gaseous or liquid coolant). The emergency cooling system, by contrast, includes a mechanical interface or is otherwise adapted to receive a receptacle containing pressurized coolant or other flash-cooling device. Such receptacle may form part of the battery pack or be installed therein after the battery pack has been provided for installation within a larger system (e.g., during assembly of an electric vehicle into which the battery pack is to be installed). As discussed above, a separate coolant canister or pouch (or any other coolant receptacle) may be provided for each battery module and the coolant therein may be released into the battery module via coolant conduction tubes or coolant flow tubes built into the battery module frame or other such coolant conduction channels. The coolant receptacle(s) within the emergency cooling system may be one-time release devices such that, upon being enabled to release coolant within the battery pack, a receptacle must either be replaced or refilled by a source external to the battery pack in order to restore the emergency cooling system to full operability. Moreover, emergency release of coolant (i.e., from the pressurized canister or other coolant receptacle of the emergency cooling system) may render the battery pack or at least the battery module or other subset of battery cells flooded or deluged by the coolant unavailable for energy delivery purposes. For example, a battery module that has been subject to flash-cooling by the emergency cooling system may be bypassed or otherwise decoupled from the load current path until later serviced or replaced as part of battery pack repair. A battery management system is provided to assert the signal indicating detection of one or more conditions indicating possible thermal runaway, and also to enable operation of the first cooling system as necessary to maintain the battery pack within an operating temperature range (e.g., switching a fan, HVAC unit, etc., on and off as necessary). Sensors may be disposed within and/or outside the battery pack to detect the conditions indicating possible thermal runaway, including without limitation, impact (e.g., via an accelerometer or other impact-detecting device), rollover, extreme temperature, presence of smoke, vapor, etc. The battery management system may also include an interface such as a controller-area network (CAN) bus interface or the like, for communicating status of the battery pack (including detecting conditions indicating possible thermal runaway) to a vehicle management system and/or directly to an operator of the vehicle or other host system of which the battery pack is a part.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A battery pack comprising:
   a plurality of battery cells;
   a first cooling system to cool the battery cells during routine charging and discharging of the battery cells; and
   a second cooling system to cool the battery cells in response to a signal indicating detection of one or more conditions indicating possible thermal runaway within the battery cells, the second cooling system having a coolant flow tube with at least one plug-free opening, the second cooling system having a coolant release device comprising a valve coupled to the coolant flow tube, the valve configured to exclude coolant from the coolant flow tube prior to the detection of the one or more conditions, the valve configured to admit the coolant to the coolant flow tube in response to the detection of the one or more conditions; and
   wherein the plurality of battery cells comprises a plurality of subsets of batteries disposed in respective battery modules, and wherein each battery module includes a frame; and wherein the second cooling system comprises a plurality of coolant receptacles containing pressurized coolant, each coolant receptacle disposed to release the pressurized coolant within a respective one of the battery modules into the spaces between the battery cells.

2. The battery pack of claim 1 wherein the first cooling system comprises a fluid pumping device.

3. The battery pack of claim 2 wherein the fluid pumping device comprises a fan and wherein a fluid pumped by the fluid pumping device comprises air.

4. The battery pack of claim 1 wherein the frame includes the coolant flow tubes to distribute the pressurized coolant, when released from the corresponding coolant receptacle, throughout the battery module.

5. The battery pack of claim 1 further comprising a battery management system to enable operation of the first cooling system as necessary to maintain the battery pack within an operating temperature range, and to assert the signal indicating detection of one or more conditions indicating possible thermal runaway within the battery cells.

6. The battery pack of claim 5 further comprising one or more sensors disposed within the battery pack to detect the one or more conditions indicating possible thermal runaway and to signal the battery management system when the one or more conditions have been detected.

7. The battery pack of claim 5 wherein the battery management system comprises an interface to a vehicle management system.

8. The battery pack of claim 7 wherein the interface comprises an interface to a controller-area network bus.

9. The battery pack of claim 1 wherein when the coolant release device is enabled to release coolant within the battery pack, at least one of the plurality of a subset of batteries is rendered unavailable for discharging current to a load until the battery pack is serviced.

10. The battery pack of claim 1 wherein after the second cooling system is enabled to release coolant within the battery pack, one of either a replacement or coolant refill from a source external to the battery pack is required to restore the second cooling system device to full operability.

* * * * *